Dec. 12, 1967     C. L. WILSON     3,357,512
VEHICLE STABILIZER
Filed Sept. 15, 1965
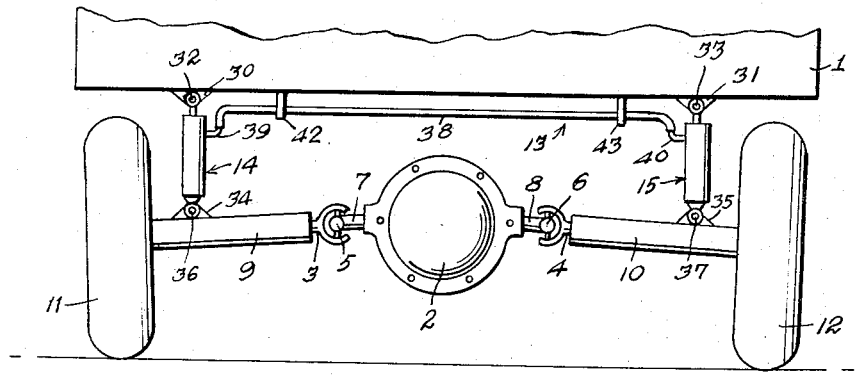
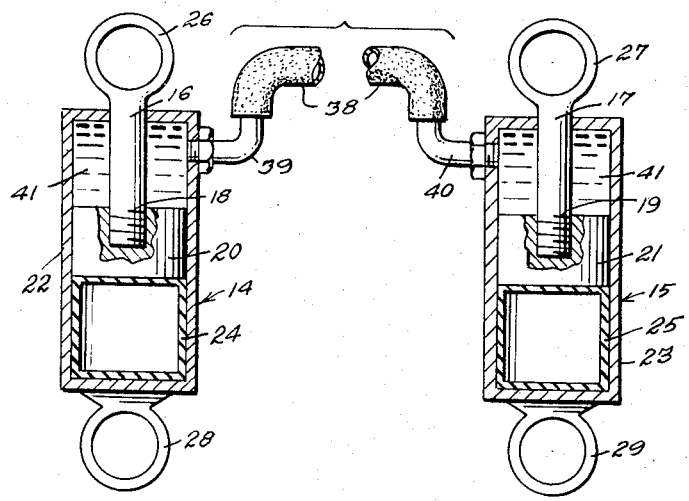
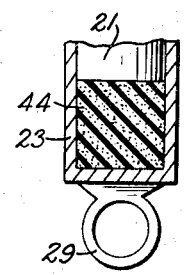
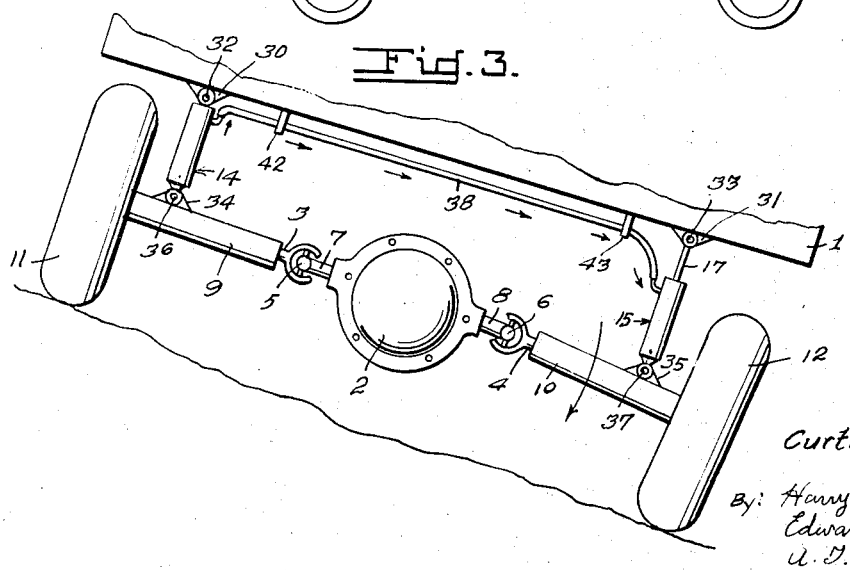
INVENTOR.
Curtis L. Wilson

United States Patent Office 3,357,512
Patented Dec. 12, 1967

3,357,512
VEHICLE STABILIZER
Curtis L. Wilson, P.O. Box 1094,
Sierra Vista, Ariz. 85635
Filed Sept. 15, 1965, Ser. No. 487,639
3 Claims. (Cl. 180—73)

ABSTRACT OF THE DISCLOSURE

A stabilizer for a vehicle having a divided axle and consisting of a pair of cylinders in fluid connection and being pivoted, one each, to an axle, and a piston slidable in each cylinder and pivoted to the body of the vehicle. Each cylinder contains a hydraulic fluid above the piston and a shock absorbing material below the piston.

---

The invention described herein may be manufactured and used by or for the Government for governmental purposes, without the payment to me of any royalty thereon.

This invention relates to a vehicle stabilizer and more particularly to a hydraulic stabilizer for use on vehicles having divided axles to provide greater stability for such vehicles when rounding curves or running along a steep hillside.

The stabilizer of the invention is especially adaptable for use with vehicles, such as jeeps, that have no sway bar or traverse stabilizing means at their rear end.

Such vehicles are somewhat difficult to handle when driven by an unfamiliar driver since, without a sway bar or stabilizing means, split rear axles can cause the rear wheel on the outside of a sharp curve to "turn under" thus creating a highly hazardous condition that may result in upset of the vehicle or loss of control by the "turning under" of the wheel when rounding the curve or running along a steep hillside.

It is, therefore, a primary object of this invention to provide a hydraulic stabilizing means for a vehicle having a divided rear axle.

Another object is to provide means for preventing overturning of a vehicle having a divided rear axle when the vehicle is rounding a curve or running along a steep hillside.

A still further object is to provide a hydraulic stabilizing means for a vehicle which operates automatically and requires little maintenance.

These and other objects and advantages of the present invention will be fully apparent from the following description when taken in connection with the annexed drawing, in which:

FIG. 1 is a somewhat schematic rear view of a vehicle having the stabilizer of the invention installed thereon:

FIG. 2 is a section taken through the two hydraulic cylinders of the stabilizer; and, FIG. 3 is a view similar to FIG. 1 wherein the vehicle is shown on a steep hillside and illustrating the action of the stabilizer system when a wheel "turns under," and FIG. 4 is a fragmentary section view of one of the cylinders and showing sponge rubber as the shock absorbing means therein.

With reference to the drawing in detail, in which like numerals indicate like parts throughout the several views, the reference numeral 1 designates a portion of the body of a jeep or like vehicle, the usual suspension elements being omitted for sake of clarity. The differential of the rear axle is designated by 2. Axles are indicated by 3 and 4, and are connected by universal joints 5 and 6 to stub axles 7 and 8 which are driven by the differential 2. Axles 3 and 4 are provided with housings 9 and 10.

Reference characters 11 and 12 indicate wheels on the ends (not shown) of axles 3 and 4.

The vehicle stabilizer of the invention is indicated generally by 13 and may replace, or be in addition to, the shock absorbers (not shown) of the vehicle.

The stabilizer 13 consists of left and right cylinder assemblies indicated generally by 14 and 15. The cylinder assemblies are identical and consist of rods 16 and 17 which are threaded at their ends as at 18 and 19 for threadable engagement in pistons 20 and 21 which are slidably mounted in cylinders 22 and 23.

Shock absorbing means are provided in each cylinder 22 and 23 and may consist of resilient bags 24 and 25, filled with air, or sponge rubber 44 as seen in FIG. 4.

Means are provided for the mounting of cylinders 22 and 23 on housings 9 and 10 and body 1 and consist of eyes 26 and 27 at the tops of rods 16 and 17 and eyes 28 and 29 fixed, or integral with the bottoms of the cylinders.

Eyes 26 and 27 are pivotally connected to brackets 30 and 31 on body 1 by bolts 32 and 33, while eyes 28 and 29 are pivotally connected to brackets 34 and 35 by bolts 36 and 37 to housings 9 and 10 respectively.

A hydraulic fluid conduit 38 connected to nipples 39 and 40 which are threadably connected to cylinders 22 and 23 respectively, as shown, provides communication between the cylinders.

Conduit 38, nipples 39 and 40 and cylinders 22 and 23 contain a hydraulic fluid 41.

The conduit 38 is flexible so as to permit play to compensate for the rocking of axles, etc. and is guided in supports 42 and 43.

The operation is simple and automatic and is best viewed in FIG. 3 in which the vehicle is shown to be on a steep hillside.

Rods 16 and 17, being connected to the vehicle 1 transmit motion to pistons 20 and 21 sliding inside cylinders 22 and 23 which contain the hydraulic fluid 41. If either of wheels 11 or 12 (FIG. 3) has a tendency to start "turning under" due to driving on a hillside, or at high speeds on sharp curves or turns or like conditions, hydraulic fluid 41 is forced through flexible conduit 38 from the cylinder on the side of the "turning under" wheel to the cylinder on the opposite side which shortens the length of the hydraulic unit on the side having the least weight, thus causing a partial retraction of the "turning under" wheel and lowering the center of gravity of the vehicle 1. (The flow of hydraulic fluid 41 being indicated by arrows for the condition shown in FIG. 3.)

While only a preferred form of the invention is shown and described, other forms of the invention are contemplated and numerous changes and modifications may be made therein without departing from the spirit of the invention as set forth in the appended claims.

What is claimed is:

1. In combination with a vehicle having a body, a differential, a pair of stub axles extending from said differential and driven thereby, a pair of axles, a universal joint connecting each of last named axles with said stub axles, and a wheel carried by each said axle connected to said stub axle; stabilizing means for said vehicle and including a pair of spaced hydraulic units pivotally connected to said body and said axles connected to said stub axles, a conduit connecting said hydraulic units; each said hydraulic unit comprising a cylinder, a piston slidable therein, a shock absorber means in the bottom of each said cylinder and below said piston, a shaft connected to said vehicle body and said piston, and a nipple connected to the upper end of said cylinder for connection to said conduit.

2. A vehicle stabilizer as set forth in claim 1 wherein said shock absorbing means comprises a resilient bag filled with air.

3. A vehicle stabilizer as set forth in claim 1 wherein said shock absorbing means comprises a mass of sponge rubber.

References Cited

UNITED STATES PATENTS

| 2,917,318 | 12/1959 | Nallinger | 280—104 |
| 2,986,403 | 5/1961 | Ziccardi | 280—104 |
| 3,025,079 | 3/1962 | Gouirand | 180—73 |

A. HARRY LEVY, *Primary Examiner.*